(12) United States Patent
Yoshimatsu (10) Patent No.: US 9,890,800 B2
(45) Date of Patent: Feb. 13, 2018

(54) DRIVE SYSTEM FOR GROUND MAINTENANCE VEHICLE

(71) Applicant: Kawasaki Jukogyo Kabushiki Kaisha, Kobe-shi, Hyogo (JP)

(72) Inventor: Atsuhiro Yoshimatsu, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 15/244,566

(22) Filed: Aug. 23, 2016

(65) Prior Publication Data

US 2017/0079210 A1 Mar. 23, 2017

(30) Foreign Application Priority Data

Sep. 18, 2015 (JP) .................................. 2015-185722

(51) Int. Cl.
  F02D 29/00 (2006.01)
  F15B 11/08 (2006.01)
  F02M 61/16 (2006.01)

(52) U.S. Cl.
  CPC ............ *F15B 11/08* (2013.01); *F02M 61/16* (2013.01)

(58) Field of Classification Search
  CPC ........ A01D 34/64; A01D 69/03; A01D 69/08; A01D 2101/00; B62D 1/187; B60W 10/06; B60W 10/182; B60W 10/10; B60W 30/18; F16D 48/064; F16D 48/06; F16D 2500/8109; F16D 2500/10418; F16D 2500/3022; F16D 2500/3069; F16D 2500/3165; F16D 2500/70264; F16D 2500/10437; F15B 11/08; F02M 61/16

USPC .......... 56/10.2 A–10.2 E, 10.2 R, 13.5, 10.5, 56/10.8, 13.3, 11.8, 11.9; 701/22, 25, 50, 701/28, 48; 192/84.1, 21.5, 82 T, 103 R; 477/176, 179, 180

See application file for complete search history.

(56) References Cited

U.S. PATENT DOCUMENTS

| 5,094,332 | A | * | 3/1992 | Wall | ..................... | F16D 48/064 |
| | | | | | | 192/103 R |
| 6,609,357 | B1 | * | 8/2003 | Davis | ................... | A01D 34/006 |
| | | | | | | 56/10.2 A |
| 8,056,695 | B2 | * | 11/2011 | Silbernagel | ............ | A01D 69/08 |
| | | | | | | 192/84.1 |
| 9,002,585 | B2 | | 4/2015 | Porter et al. | | |
| 2007/0294017 | A1 | * | 12/2007 | Joshi | ...................... | F16D 48/06 |
| | | | | | | 701/67 |
| 2010/0033890 | A1 | * | 2/2010 | Harnett | ................. | F16D 48/064 |
| | | | | | | 361/160 |
| 2010/0125384 | A1 | * | 5/2010 | Wyatt | .................. | B60K 7/0007 |
| | | | | | | 701/22 |

(Continued)

*Primary Examiner* — Robert E Pezzuto (57) ABSTRACT

A mower includes an engine which is a power source for a drive wheel and a mowing mechanism. A drive system for the mower includes: a first control unit that controls operation and stop of the engine; a first power transmitting mechanism that performs transmission of power between the engine and the drive wheel; a second power transmitting mechanism that performs transmission of power between the engine and the mowing mechanism; and a second control unit that controls the second power transmitting mechanism. The first control unit also controls the first power transmitting mechanism. A signal transmitter is provided which transmits a control signal between the first control unit and the second control unit.

6 Claims, 5 Drawing Sheets

(56) References Cited

U.S. PATENT DOCUMENTS

2016/0355186 A1* 12/2016 Kanitz .................. B62D 1/187

* cited by examiner

| STATE | PRESENCE/ABSENCE OF ENGINE ABNORMALITY | | | FIRST POWER TRANSMITTING MECHANISM | SECOND POWER TRANSMITTING MECHANISM | ENGINE ROTATION SPEED | WORKING STATE |
|---|---|---|---|---|---|---|---|
| | ENGINE OIL PRESSURE | ENGINE TEMPERATURE | COMBUSTION STATE | | | | |
| 1 | ○ | ○ | ○ | CONNECTED | CONNECTED | MAXIMUM SPEED | MOWER IS WORKABLE WITHOUT RESTRICTION |
| 2 | ○ | × | ○ | CONNECTED | DIS-CONNECTED | MAXIMUM SPEED | MOWER IS RUNNABLE BUT NOT WORKABLE |
| 3 | ○ | × | × | DIS-CONNECTED | DIS-CONNECTED | IDLING | MOWER IS NEITHER RUNNABLE NOR WORKABLE |
| 4 | × | ○ | ○ | CONNECTED | DIS-CONNECTED | 1/2 SPEED | MOWER IS RUNNABLE AT LOW SPEED BUT NOT WORKABLE |
| 5 | × | × | ○ | DIS-CONNECTED | DIS-CONNECTED | IDLING | MOWER IS NEITHER RUNNABLE NOR WORKABLE |
| 6 | × | × | × | DIS-CONNECTED | DIS-CONNECTED | STOP | MOWER IS NEITHER RUNNABLE NOR WORKABLE |
| 7 | × | ○ | × | CONNECTED | DIS-CONNECTED | 1/2 SPEED | MOWER IS RUNNABLE BUT NOT WORKABLE |

PRIOR ART

DRIVE SYSTEM FOR GROUND MAINTENANCE VEHICLE

CROSS REFERENCE TO THE RELATED APPLICATION

This application is based on and claims Convention priority to Japanese patent application No. 2015-185722, filed Sep. 18, 2015, the entire disclosure of which is herein incorporated by reference as a part of this application.

BACKGROUND OF THE INVENTION (Field of the Invention)

The present invention relates to a drive system for a ground maintenance vehicle such as a ride-on type mower or a tiller, for example.

(Description of Related Art)

In a ride-on type ground maintenance vehicle such as a large-scale mower which is driven by an operator riding on the vehicle, an engine is generally used as a power source for drive wheels of the vehicle and a power source for the mower that is a working mechanism (refer to U.S. Pat. No. 9,002,585, for example). In such a ground maintenance vehicle, each of the engine and the mower may include an electronic control unit (ECU). In this case, the ECU of the engine controls start, operation, and stop of the engine and detects abnormality of the engine, while the ECU of the mower controls moving and stopping the mower, or execution and stopping of the mowing operation.

In the conventional control for the engine by the ECU of the engine, if abnormality of the engine is detected, the ECU of the engine merely has a function of stopping the engine to protect the engine. However, depending on the content of a failure, there are cases where the engine need not be stopped or should not be stopped when the place where the vehicle runs, the driving state of the working mechanism or the like is considered.

SUMMARY OF THE INVENTION

An object of the present invention is to provide a drive system for a ground maintenance vehicle, capable of taking appropriate measures depending on the content of abnormality of an engine.

In order to achieve the above-described object, a drive system for a ground maintenance vehicle according to the present invention includes: an engine serving as a power source for a drive wheel and a working mechanism; a first control unit that controls operation and stop of the engine; a first power transmitting mechanism that performs transmission of power between the engine and the drive wheel; a second power transmitting mechanism that performs transmission of power between the engine and the working mechanism; and a second control unit that controls the second power transmitting mechanism. The first control unit controls the first power transmitting mechanism. Signal transmitter is provided which transmits a control signal between the first control unit and the second control unit. The ground maintenance vehicle include, for example, a mower, a snow plow and agricultural machinery.

According to the above configuration, since the signal transmitter that transmits a control signal between the first control unit of the engine and the second control unit of the working mechanism is provided, the first control unit of the engine and the second control unit of the working mechanism can share information in the second control unit, i.e., information of the working mechanism. Therefore, when abnormality of the engine is detected, the cause of the abnormality can be determined based on both the information from the engine side and the information from the working mechanism side. As a result, appropriate measures can be taken depending on the content of the abnormality of the engine, thereby avoiding unnecessary stop of the engine.

In the present invention, the engine preferably includes a fuel injection device. According to this configuration, operation control and stop control for the engine are facilitated.

In the present invention, the second power transmitting mechanism preferably includes an electromagnetic clutch. In this case, the second control unit preferably disconnects the electromagnetic clutch upon receiving a command indicative of engine abnormality from the first control unit. According to this configuration, electrical control for the second power transmitting mechanism can be easily performed in accordance with the command from the first control unit, through the second control unit.

In the present invention, the first power transmitting mechanism preferably includes an oil pump and a hydraulic motor. According to this configuration, control for the first power transmitting mechanism can be easily and electrically performed by the first control unit.

In the present invention, the engine is preferably used as a drive source for a ride-on type mower.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
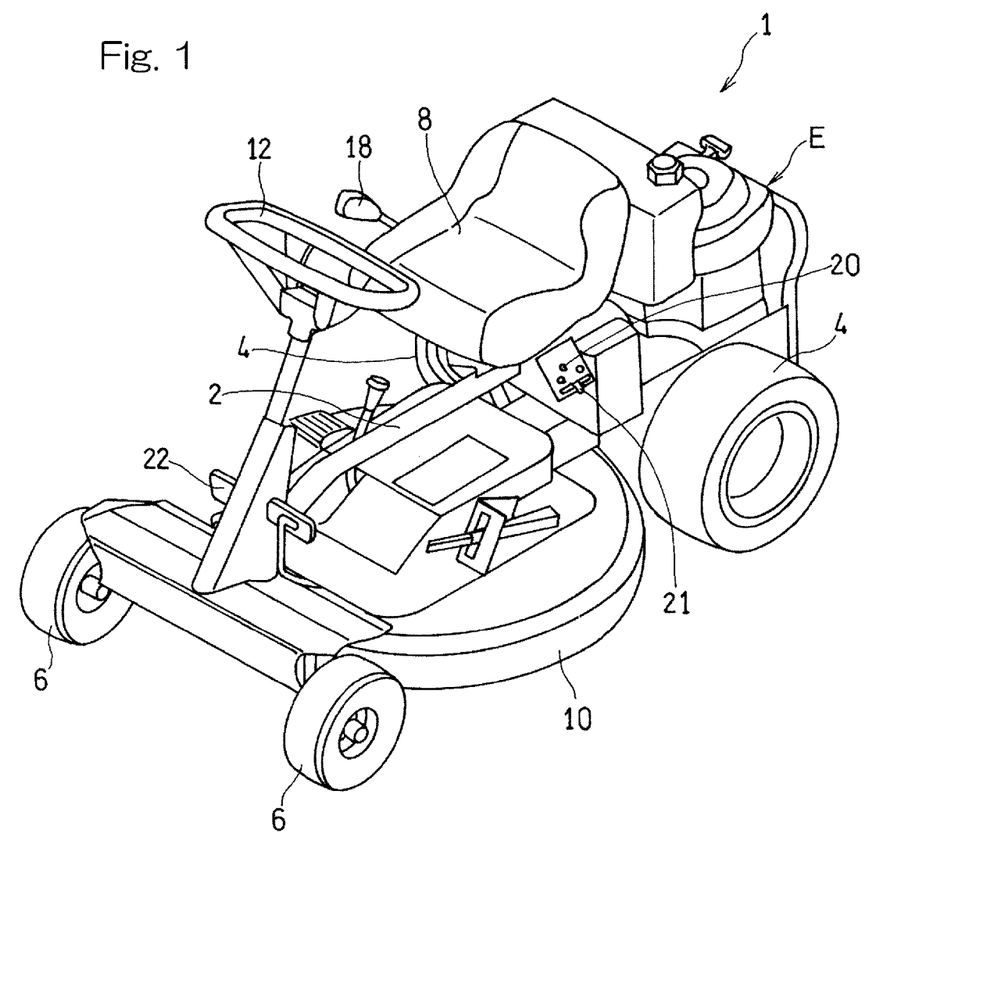
FIG. 1 is a perspective view illustrating a mower which is one type of a ground maintenance vehicle including a drive system according to a first embodiment of the present invention.

Hereinafter, preferred embodiments of the present invention will be described with reference to the accompanying drawings. FIG. 1 is a perspective view of a mower 1 which is one type of a ground maintenance vehicle equipped with an engine, according to a first embodiment of the present invention. The mower 1 according to this embodiment is a ride-on type mower which is driven by an operator riding on the mower. In the mower 1, left and right rear wheels 4, which are drive wheels, are supported by a rear end portion of a vehicle body frame 2 extending in a front-rear direction, and left and right front wheels 6, which are driven wheels, are supported by a front end portion of the vehicle body frame 2.

Between the front wheels 6 and the rear wheels 4, an operator's seat 8 is disposed above the vehicle body frame 2, and a mowing mechanism 10, which is one type of a working mechanism, is disposed below the vehicle body frame 2 and is supported by the vehicle body frame 2. An engine E is installed behind the operator's seat 8 and between the left and right rear wheels 4. The engine E according to the present embodiment is an FI engine including a fuel injection device. The engine E is a power source for the drive wheels 4 and the mowing mechanism 10.

Figure 2:
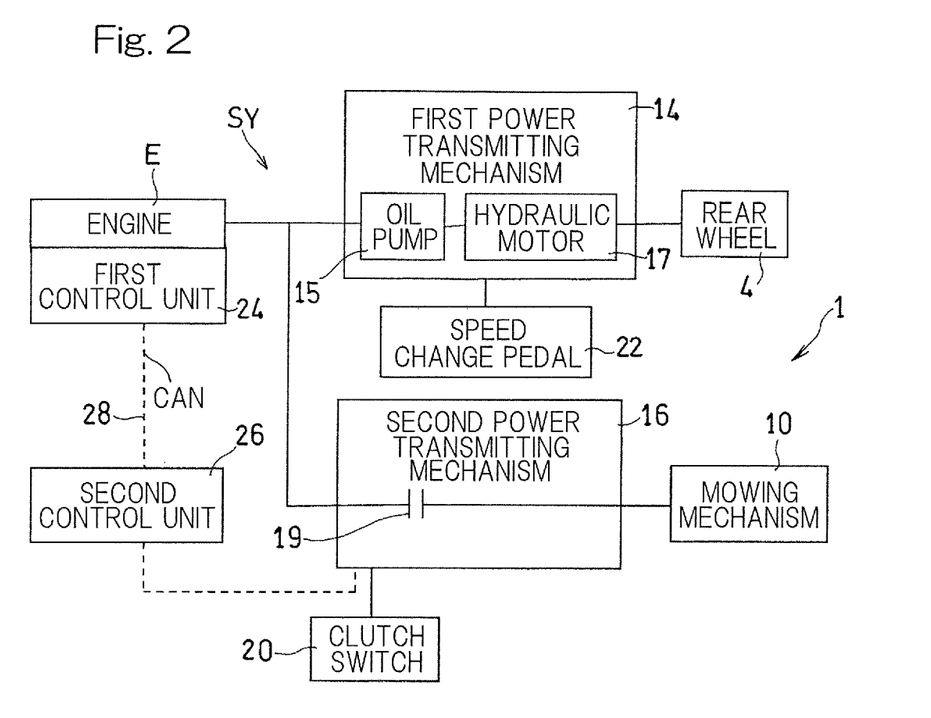
FIG. 2 is a block diagram illustrating a control system of the drive system.

FIG. 2 shows a drive system SY according to the present invention. In FIG. 2, power of the engine E is transmitted to the rear wheels 4 through a first power transmitting mechanism 14, and power of the engine E is transmitted to the mowing mechanism 10 through a second power transmitting mechanism 16. The first power transmitting mechanism 14 according to the present embodiment includes an oil pump 15 and a hydraulic motor 17. The hydraulic motor 17 is activated by high-pressure oil supplied from the oil pump 15 mechanically connected to the engine E, thereby driving the rear wheels 4 connected to the hydraulic motor 17. The second power transmitting mechanism 16 includes an electromagnetic clutch 19. However, the power transmitting mechanisms 14 and 16 are not limited thereto. For example, an electromagnetic clutch may be used as the first power transmitting mechanism 14.

A steering handle 12 is disposed in front of the operator's seat 8 shown in FIG. 1 and above the front wheels 6, and is connected to the front wheels 6 through a steering mechanism (not shown). A speed change lever 18 for controlling the running direction (forward or backward) of the mower 1 is disposed on a lateral side of the operator's seat 8. A speed change pedal 22 for controlling the running speed is disposed above the front wheels 6 and below the handle 12 in a front portion of the vehicle body. That is, when the engine E starts to operate, the rear wheels 4 (the drive wheels) are rotated by actuation of the oil pump 15 and the hydraulic motor 17 shown in FIG. 2, and the mower 1 travels. An operator seated on the operator's seat 8 shown in FIG. 1 turns the vehicle body with the handle 12 while controlling the running speed with the speed change pedal 22, thereby moving the mower 1.

A clutch switch 20 and a throttle lever 21 are disposed on a lateral side of the operator's seat 8. The clutch switch 20 performs an operation to connect/disconnect the second power transmitting mechanism 16 (FIG. 2). The throttle lever 21 controls the rotation speed of the engine E. That is, when the clutch switch 20 is operated with the engine E being started to operate, the second power transmitting mechanism 16 (FIG. 2) is connected, and the mowing mechanism 10 is rotated. The operator performs mowing while adjusting the rotation speed of the mowing mechanism 10 with the throttle lever 21.

As shown in FIG. 2, the engine E includes a first control unit 24 that controls operation and stop of the engine E, and the rotation speed of the engine E. The first control unit 24 is composed of an electronic control unit (ECU). The engine E is provided with sensors such as an oil pressure sensor that detects the pressure of engine lubricating oil, a temperature sensor that detects the temperature of the engine, and a combustion sensor that detects vibration of the engine to detect the combustion state of the engine. Signals from these sensors are inputted to the first control unit 24. The first control unit 24 also controls the first power transmitting mechanism 14. That is, information of the first power transmitting mechanism 14 is also inputted to the first control unit 24.

The mower 1 is provided with a second control unit 26 that controls the second power transmitting mechanism 16. The second control unit 26 according to the present embodiment is composed of an electronic control unit (ECU), and also controls the mowing mechanism 10. The first control unit 24 and the second control unit 26 are connected to each other through signal transmitter 28, and a control signal is transmitted between these units 24 and 26. Accordingly, for example, information of the electromagnetic clutch 19 acquired in the second control unit 26 is inputted to the first control unit 24 through the signal transmitter 28. In the present embodiment, a controller area network (CAN) is used as the signal transmitter 28. However, the signal transmitter 28 is not limited to the CAN.

Figure 3:
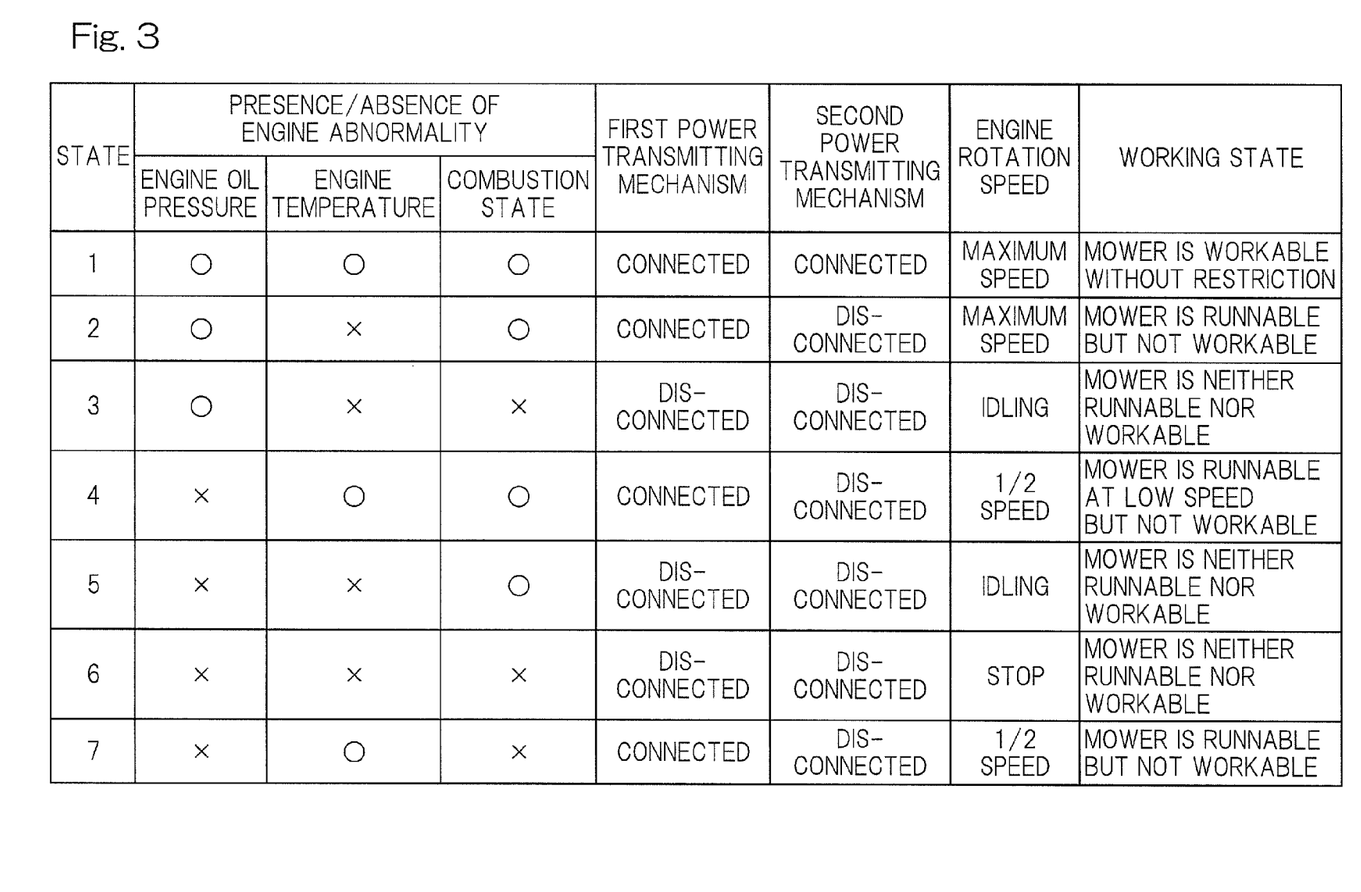
FIG. 3 is a table illustrating measures taken by the drive system when abnormality occurs.

FIG. 3 is a table showing an example of control for the mower 1 in the case where abnormality of the engine E is detected. As examples of abnormalities of the engine E, abnormal oil pressure, abnormal temperature and abnormal combustion are shown. State 1 is a normal state where no abnormality occurs. In state 1, the mower 1 can work without restriction. That is, the first and second power transmitting mechanisms 14 and 16 are connected, and the engine E can be rotated at the maximum speed.

State 2 stands a situation where abnormal temperature of the engine is detected. In state 2, the mower 1 can travel but cannot perform mowing. Accordingly, the first control unit 24 transmits a command indicating engine abnormality and a clutch disconnection command to the second control unit 26. Upon receiving these commands, the second control unit 26 disconnects the electromagnetic clutch 19 of the second power transmitting mechanism 16.

State 3 stands a situation where abnormal temperature of the engine and abnormal combustion of the engine are detected. In state 3, the mower 1 can neither travel nor perform mowing. Accordingly, the first control unit 24 cuts off the connection between the oil pump 15 and the hydraulic motor 17 in the first power transmitting mechanism 14 to disconnect the first power transmitting mechanism 14, and also transmits a command indicating engine abnormality and a clutch disconnection command to the second control unit 26. Upon receiving these commands, the second control unit 26 disconnects the electromagnetic clutch 19 of the second power transmitting mechanism 16. The engine E is not stopped but is in the idling state.

State 4 stands a situation where abnormal oil pressure of the engine is detected. In state 4, the mower 1 can travel at a low speed but cannot perform mowing. Accordingly, the first control unit 24 reduces the rotation speed of the engine to ½, and transmits a command indicating engine abnormality and a clutch disconnection command to the second control unit 26. Upon receiving these commands, the second control unit 26 disconnects the electromagnetic clutch 19 of the second power transmitting mechanism 16.

State 5 stands a situation where abnormal oil pressure and abnormal temperature of the engine are detected. In state 5, the mower 1 can neither travel nor perform mowing. Accordingly, the first control unit 24 cuts off the connection between the oil pump 15 and the hydraulic motor 17 in the first power transmitting mechanism 14 to disconnect the first power transmitting mechanism 14, and transmits a command indicating engine abnormality and a clutch disconnection command to the second control unit 26. Upon receiving these commands, the second control unit 26 disconnects the electromagnetic clutch 19 of the second power transmitting mechanism 16. The engine E is not stopped but is in the idling state.

State 6 stands a situation where abnormal oil pressure, abnormal temperature, and abnormal combustion of the engine are detected. In state 6, the mower 1 can neither travel nor perform mowing, and the engine needs to be stopped. Accordingly, the first control unit 24 stops the engine and disconnects the first power transmitting mechanism 14, and transmits a command indicating engine abnormality and a clutch disconnection command to the second control unit 26. Upon receiving these commands, the second control unit 26 disconnects the electromagnetic clutch 19 of the second power transmitting mechanism 16.

State 7 stands a situation where abnormal oil pressure and abnormal combustion of the engine are detected. In state 7, the mower 1 can travel at a low speed but cannot perform mowing. Accordingly, the first control unit 24 reduces the rotation speed of the engine to ½, and transmits a command indicating engine abnormality and a clutch disconnection command to the second control unit 26. Upon receiving these commands, the second control unit 26 disconnects the electromagnetic clutch 19 of the second power transmitting mechanism 16.

Figure 5:
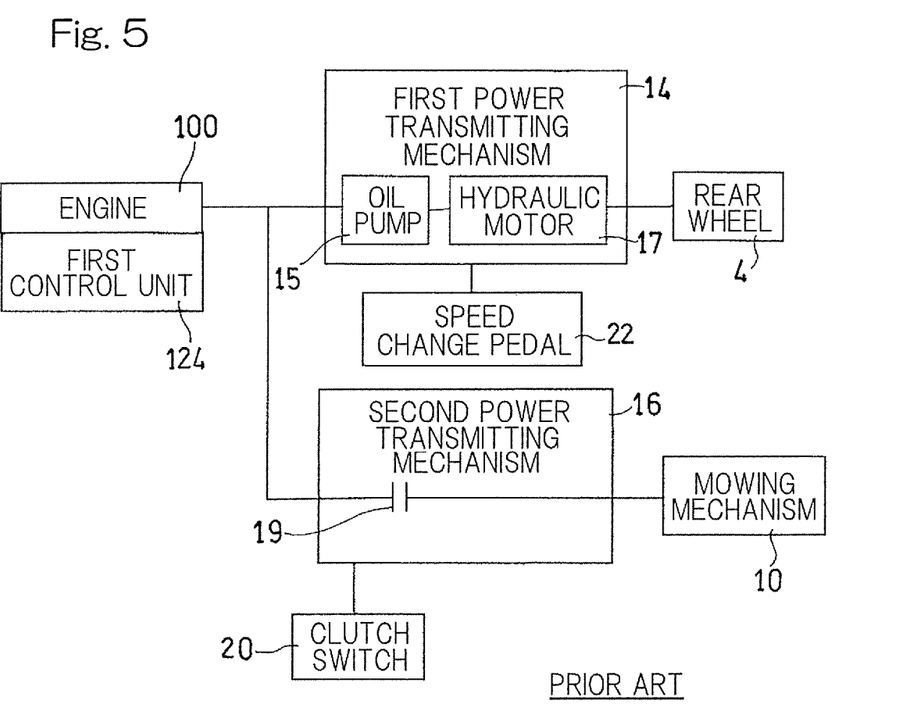
FIG. 5 is a block diagram illustrating a control system of a conventional drive system.

FIG. 5 is a block diagram illustrating a conventional engine control system. In FIG. 5, information of the mowing mechanism 10, e.g., information of the second power transmitting mechanism 16 is not inputted to the first control unit 124 of an engine 100. Therefore, even in the states 2 to 5 and 7 shown in FIG. 3, the engine 100 is stopped to protect the engine 100. As a result, it is necessary to stop and restart the engine 100 every time abnormality is detected.

According to the configuration of the above-mentioned embodiment, as shown in FIG. 2, the signal transmitter 28 is provided which transmits a control signal between the first control unit 24 of the engine E and the second control unit 26 of the mower 1. Thus, the first control unit 24 of the engine E can share information in the second control unit 26 of the mowing mechanism 10. Accordingly, when abnormality of the engine E is detected, the cause of the abnormality can be determined based on both the information from the engine E side and the information from the mowing mechanism 10 side. As a result, appropriate measures can be taken depending on the content of the abnormality of the engine E, thereby avoiding unnecessary stop and restart of the engine E. Specifically, in the states 2 to 5 and 7 shown in FIG. 3, it is not necessary to stop the engine E.

Since the engine E is an FI engine including a fuel injection device, it is easy to perform operation control and stop control for the engine. Further, since the first power transmitting mechanism 14 shown in FIG. 2 includes the oil pump 15 and the hydraulic motor 17, the first power transmitting mechanism 14 can be easily and electrically controlled by the first control unit 24.

The second power transmitting mechanism 16 shown in FIG. 2 includes the electromagnetic clutch 19, and the second control unit 26 disconnects the electromagnetic clutch 19 upon receiving a command indicating engine abnormality from the first control unit 24. Specifically, in the states 2 to 5 and 7 shown in FIG. 3, the second control unit 26 disconnects the electromagnetic clutch 19 without stopping the engine E. Thus, electrical control for the second power transmitting mechanism 16 can be easily performed in accordance with the command from the first control unit 24, through the second control unit 26.

Figure 4:
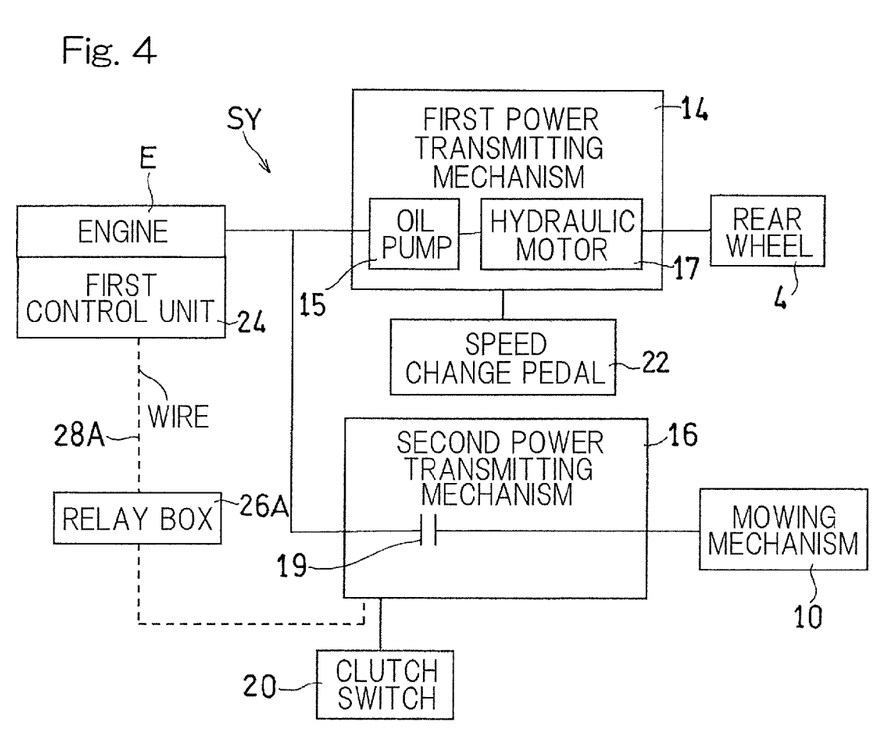
FIG. 4 is a block diagram illustrating a control system of a drive system according to a second embodiment of the present invention.

FIG. 4 is a block diagram illustrating an engine control system according to a second embodiment of the present invention. In the second embodiment, the mower is not provided with an electronic control unit (ECU) that controls the second power transmitting mechanism 16. Instead, the mower is provided with a relay box 26A that controls the second power transmitting mechanism 16. The relay box 26A and the first control unit 24 are connected by a wire 28A to enable transmission of a control signal therebetween. That is, the relay box 26A forms the second control unit, and the wire 28A forms the signal transmitter. The other components are the same as in the first embodiment. Also in the second embodiment, the same effects as in the first embodiment can be achieved.

The present invention is not limited to the embodiments described above, and various additions, modifications, or deletions may be made without departing from the gist of the invention. For example, although the ride-on type mower has been described as the ground maintenance vehicle in the above embodiments, the ground maintenance vehicle is not limited thereto. For example, the ground maintenance vehicle may be ride-on type agricultural machinery or snow plow, or a hand-held type mower, snow plow or agricultural machinery. Therefore, these are construed as included within the scope of the present invention.

REFERENCE NUMERALS

1 . . . mower (ground maintenance vehicle)
4 . . . rear wheel (drive wheel)
10 . . . mowing mechanism (working mechanism)
14 . . . first power transmitting mechanism
15 . . . oil pump
16 . . . second power transmitting mechanism
17 . . . hydraulic motor
19 . . . electromagnetic clutch (second power transmitting mechanism)
24 . . . first control unit
26 . . . second control unit (ECU)
26A . . . second control unit (relay box)
28 . . . signal transmitter (CAN)
28A . . . signal transmitter (wire)
E . . . engine (power source)
SY . . . drive system

What is claimed is:

1. A drive system for a ground maintenance vehicle, comprising:
   an engine serving as a power source for a drive wheel and a working mechanism;
   one or more sensors configured to detect a condition of the engine;
   a first control unit configured to control operation and stop of the engine;
   a first power transmitting mechanism configured to perform transmission of power between the engine and the drive wheel, the first control unit controlling the first power transmitting mechanism;
   a second power transmitting mechanism configured to perform transmission of power between the engine and the working mechanism;
   a second control unit configured to control the second power transmitting mechanism; and
   a signal transmitter configured to transmit a control signal between the first control unit and the second control unit, wherein the first control unit is configured to control the engine, the first power transmitting mechanism, and the second power transmitting mechanism, based on the detected condition of the engine, to assume at least one of the operating states (a) to (e):
- (a) the first power transmitting mechanism is connected, the second power transmitting mechanism is connected, and the engine is operated at a maximum speed,
- (b) the first power transmitting mechanism is connected, the second power transmitting mechanism is disconnected, and the engine is operated at a maximum speed,
- (c) the first power transmitting mechanism is connected, the second power transmitting mechanism is disconnected, and the engine is operated at a ½ speed,
- (d) the first power transmitting mechanism is disconnected, the second power transmitting mechanism is disconnected, and the engine is operated at an idling speed, or
- (e) the first power transmitting mechanism is disconnected, the second power transmitting mechanism is disconnected, and the engine is stopped.

2. The drive system for a ground maintenance vehicle as claimed in claim 1, wherein the engine includes a fuel injection device.

3. The drive system for a ground maintenance vehicle as claimed in claim 1, wherein the second power transmitting mechanism includes an electromagnetic clutch.

4. The drive system for a ground maintenance vehicle as claimed in claim 3, wherein the second control unit disconnects the electromagnetic clutch upon receiving a command indicative of engine abnormality from the first control unit.

5. The drive system for a ground maintenance vehicle as claimed in claim 1, wherein the first power transmitting mechanism includes an oil pump and a hydraulic motor.

6. The drive system for a ground maintenance vehicle as claimed in claim 1, wherein the working mechanism is a mowing mechanism, and the ground maintenance vehicle is a ride-on type vehicle.

* * * * *